United States Patent
Qin et al.

(10) Patent No.: US 10,962,825 B2
(45) Date of Patent: Mar. 30, 2021

(54) DISPLAY PANEL AND DISPLAY DEVICE

(71) Applicant: BOE TECHNOLOGY GROUP CO., LTD., Beijing (CN)

(72) Inventors: Wei Qin, Beijing (CN); Kuanjun Peng, Beijing (CN); Xiaolong Li, Beijing (CN); Tieshi Wang, Beijing (CN); Xueling Gao, Beijing (CN); Jintao Peng, Beijing (CN); Shengnan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/429,841

(22) Filed: Jun. 3, 2019

(65) Prior Publication Data
US 2020/0124912 A1 Apr. 23, 2020

(30) Foreign Application Priority Data
Oct. 23, 2018 (CN) .......................... 201811237419.3

(51) Int. Cl.
*G02F 1/1335* (2006.01)
*G02F 1/1337* (2006.01)
*G02F 1/1343* (2006.01)

(52) U.S. Cl.
CPC ...... *G02F 1/133528* (2013.01); *G02F 1/1337* (2013.01); *G02F 1/1343* (2013.01); *G02F 1/133514* (2013.01)

(58) Field of Classification Search
CPC ......... G02F 1/133528; G02F 1/133514; G02F 1/1337; G02F 1/1343

(Continued)

(56) References Cited

U.S. PATENT DOCUMENTS

2010/0052528 A1\* 3/2010 Park .................... H01L 51/5281
313/506
2012/0224113 A1 9/2012 Oh et al.
(Continued)

FOREIGN PATENT DOCUMENTS

CN 102655163 A 9/2012
CN 103217828 A 7/2013
(Continued)

OTHER PUBLICATIONS

First Office Action and English language translation, CN Application No. 201811237419.3, dated Mar. 13, 2020, 13 pp.

*Primary Examiner* — Nathanael R Briggs
*Assistant Examiner* — William D Peterson
(74) *Attorney, Agent, or Firm* — Myers Bigel, P.A.

(57) ABSTRACT

A display panel is provided, including an organic electroluminescent device including an anode layer, a liquid crystal cell on a light exit side of the organic electroluminescent device. The liquid crystal cell includes a liquid crystal layer, a linear polarizer on a side of the liquid crystal cell facing away from the organic electroluminescent device and configured to convert ambient light into a first polarized light, and an electrode assembly configured to control deflection of liquid crystal molecules in the liquid crystal layer to convert reflected light from the anode layer into a second polarized light. A second polarization direction of the second polarized light is different from a first polarization direction of the first polarized light. The display panel may decrease the intensity of reflected light perceived by the user when viewing the displayed image in an ambient environment.

18 Claims, 1 Drawing Sheet

(58) Field of Classification Search
USPC .......................................................... 349/96
See application file for complete search history.

(56) References Cited

U.S. PATENT DOCUMENTS

2013/0215365 A1     8/2013  Huang et al.
2017/0285400 A1    10/2017  Park et al.
2018/0286335 A1*   10/2018  Zhu ......................... G02F 1/163

FOREIGN PATENT DOCUMENTS

CN      103293754 A     9/2013
CN      107272249 A    10/2017

* cited by examiner

DISPLAY PANEL AND DISPLAY DEVICE

RELATED APPLICATION

The present application claims the benefit of Chinese Patent Application No. 201811237419.3, filed on Oct. 23, 2018, the entire disclosure of which is incorporated herein by reference.

TECHNICAL FIELD

The present disclosure relates to the field of display technologies, and particularly to a display panel and a display device.

BACKGROUND

In recent years, OLED (Organic Light Emitting Diode, organic electroluminescent device) display technology has developed rapidly, becoming a new generation display technology in place of liquid crystal display technology.

However, in an ambient environment with strong light, it is often difficult to see clearly content displayed by an OLED display. In order to view the displayed content more clearly, the user often needs to adjust the screen brightness to a high degree, which affects the service life of the display product.

SUMMARY

An embodiment of the present disclosure provide a display panel, which comprises an organic electroluminescent device comprising an anode layer; a liquid crystal cell located on a light exit side of the organic electroluminescent device, the liquid crystal cell comprising a liquid crystal layer; a linear polarizer disposed on a side of the liquid crystal cell facing away from the organic electroluminescent device and configured to convert ambient light into a first polarized light, and an electrode assembly configured to control deflection of liquid crystal molecules in the liquid crystal layer to convert reflected light from the anode layer into a second polarized light, a polarization direction of the second polarized light is different from a polarization direction of the first polarized light.

In some embodiments, the liquid crystal cell comprises an array substrate located on a side of the liquid crystal layer facing away from the organic electroluminescent device, the array substrate comprises a pixel electrode, the organic electroluminescent device further comprises a cathode layer, the electrode assembly comprises the pixel electrode and the cathode layer.

In some embodiments, the cathode layer is located on a side of the anode layer facing the liquid crystal layer, the display panel further comprises a color filter layer located on a side of the cathode layer facing the liquid crystal layer.

In some embodiments, the liquid crystal cell comprises an array substrate on a side of the liquid crystal layer facing away from the organic electroluminescent device, the array substrate comprises a pixel electrode and a common electrode, the electrode assembly comprises the pixel electrode and the common electrode.

In some embodiments, the liquid crystal cell further comprises an array substrate and a counter substrate opposite to each other, the liquid crystal layer is located between the array substrate and the counter substrate, the array substrate is located between the liquid crystal layer and the organic electroluminescent device, the array substrate is provided with a common electrode and a pixel electrode, the electrode assembly comprises the pixel electrode and the common electrode.

In some embodiments, the counter substrate comprises a color filter layer.

In some embodiments, the liquid crystal cell further comprises an array substrate and a counter substrate opposite to each other, the liquid crystal layer is located between the array substrate and the counter substrate, the array substrate is located between the liquid crystal layer and the organic electroluminescent device, the array substrate is provided with a pixel electrode, the counter substrate is provided with a common electrode, the electrode assembly comprises the pixel electrode and the common electrode.

In some embodiments, the counter substrate is provided with a color filter layer.

In some embodiments, the liquid crystal cell further comprises an array substrate, the electrode assembly comprises a pixel electrode of the array substrate, the array substrate comprises a plurality of gate lines and a plurality of data lines, the plurality of gate lines and the plurality of data lines intersect each other to divide the array substrate into a plurality of pixel regions, a single pixel region among the plurality of pixel regions corresponds to at least one organic electroluminescent device.

In some embodiments, the liquid crystal cell comprises an alignment film, the alignment film is configured to determine an initial state of the liquid crystal molecules such that the polarization direction of the second polarized light is perpendicular to the polarization direction of the first polarized light.

Another embodiment of the present disclosure provides a display device comprising the display panel as described in any of the foregoing embodiments.

BRIEF DESCRIPTION OF THE DRAWINGS

The accompanying drawings schematically show partial structures of a display panel provided by embodiments of the disclosure, wherein.

Figure 1:
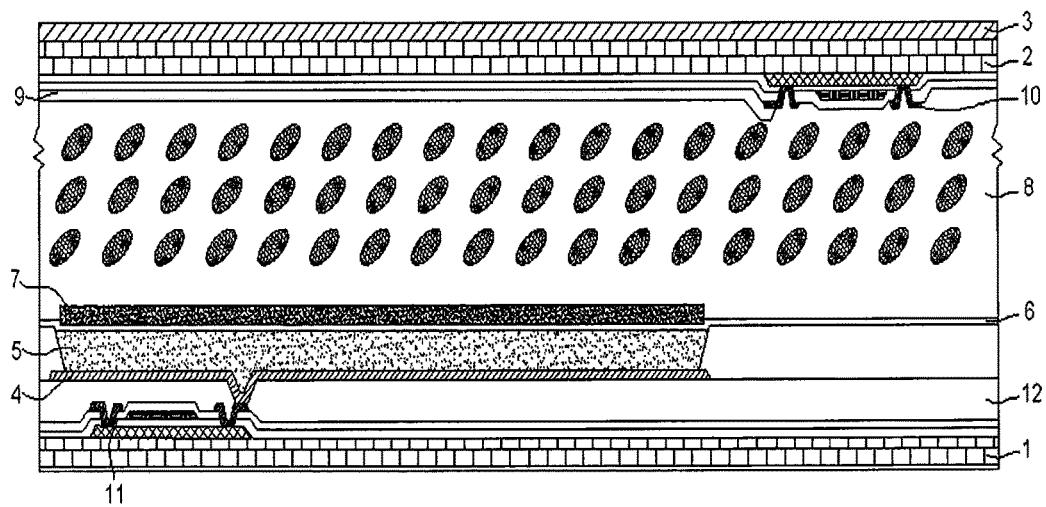
FIG. 1 is a schematic view showing a partial structure of a display panel provided by an embodiment of the present disclosure.

Reference numerals: 1—glass substrate; 2—base substrate; 3—linear polarizer; 4—anode layer; 5—organic electroluminescent layer; 6—cathode layer; 7—color filter layer; 8—liquid crystal layer; 9—pixel electrode; 10—thin film transistor device; 11—thin film transistor switch; 12—planarization layer.

DETAILED DESCRIPTION OF EMBODIMENTS

The technical solutions in embodiments of the disclosure will be clearly and completely described below with reference to the accompanying drawings herein. It is apparent that the described embodiments are only a part of possible embodiments of the disclosure, rather than all of them. All other embodiments obtained by those ordinarily skilled in the art based on the embodiments herein without inventive efforts fall within the protection scope of the present application.

In the following description, some reference numerals may be mentioned: 1—glass substrate; 2—base substrate; 3—linear polarizer; 4—anode layer; 5—organic electroluminescent layer; 6—cathode layer; 7—color filter layer; 8—liquid crystal layer; 9—pixel electrode; 10—thin film transistor device; 11—thin film transistor device; 12—planarization layer.

A display panel provided by an embodiment of the present disclosure comprises an organic electroluminescent device, the organic electroluminescent device comprising an anode layer; a liquid crystal cell located on a light exit side of the organic electroluminescent device, the liquid crystal cell comprising a liquid crystal layer; a linear polarizer disposed on a side of the liquid crystal cell facing away from the organic electroluminescent device and configured to convert ambient light into a first polarized light; and an electrode assembly configured to control deflection of liquid crystal molecules in the liquid crystal layer to convert reflected light from the anode layer into a second polarized light, the polarization direction of the second polarized light being different from the polarization direction of the first polarized light.

The ambient light outside the display panel is usually natural light or illumination light. The linear polarizer of the display panel may convert the ambient light into the first polarized light, and the polarization direction of the first polarized light coincides with the direction of the light transmission axis of the linear polarizer. The first polarized light may passes through the liquid crystal layer to reach the anode layer of the organic electroluminescent device, the anode layer may reflect the light reaching the surface of the anode layer, and the reflected light passes through the liquid crystal layer again to form the second polarized light described above. By means of the liquid crystal layer, it is achievable that the polarization direction of the second polarized light is different from that of the first polarized light, so the polarization direction of the second polarized light does not coincide with the direction of the light transmission axis of the linear polarizer. Therefore, the second polarized light would at least not completely pass through the linear polarizer, such that the amount of light reflected from the inside of the display panel may be reduced, which is advantageous for improving the definition of the image displayed by the display panel.

The display panel provided by the embodiment of the present disclosure will be illustrated below by specific examples. As shown in FIG. 1, according to an embodiment of the present disclosure, an organic electroluminescent device in the display panel comprises an anode layer 4. The display panel further comprises a liquid crystal cell located on a light exit side of the organic electroluminescent device, and the liquid crystal cell comprises a liquid crystal layer 8. A linear polarizer 3 is disposed on a side of the liquid crystal cell facing away from the organic electroluminescent device, and the linear polarizer 3 may convert external ambient light into a first polarized light. Liquid crystal molecules in the liquid crystal layer 8 may be deflected under the effect of the electric field generated by an electrode assembly, thereby controlling or adjusting the polarization state of light passing through the liquid crystal layer. For ambient light entering the display panel through the polarizer, it firstly passes through the liquid crystal layer to reach the anode of the organic electroluminescent device, and then passes through the liquid crystal layer again. Therefore, the liquid crystal layer may exert influence on the polarization state of the ambient light entering the display panel twice. This makes it easier to enable the polarization state of the second polarized light that finally leaves the liquid crystal layer to differ from the polarization direction of the first polarized light that originally reaches the liquid crystal layer, such that the second polarized light may not pass through the linear polarizer, or only part of the second polarized light is emitted from the linear polarizer.

Figure 3:
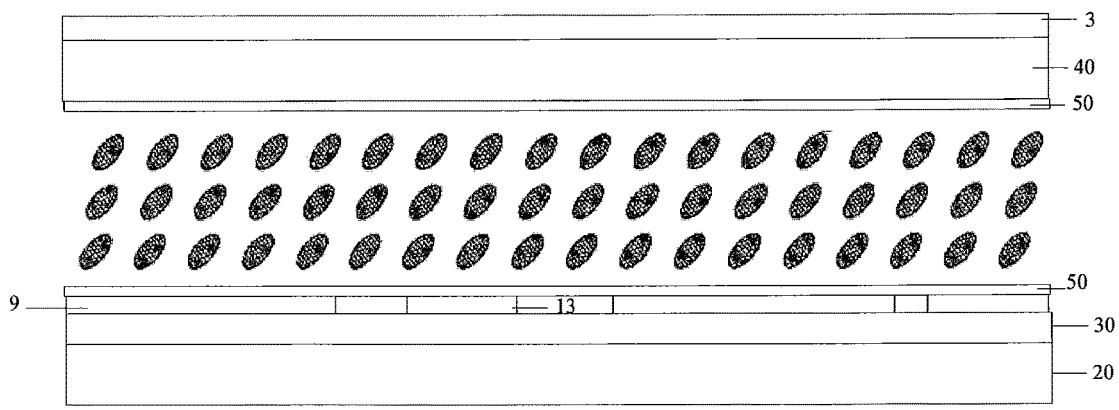
FIG. 3 is a schematic view showing a partial structure of a display panel provided by a further embodiment of the present disclosure.

According to an embodiment of the present disclosure, as shown in FIG. 3, the liquid crystal cell comprises an alignment film 50 which is configured to determine an initial state of the liquid crystal molecules such that the polarization direction of the second polarized light is perpendicular to the polarization direction of the first polarized light. That is, in case no voltage is applied to the above electrode assembly, liquid crystal molecules in the liquid crystal cell are in an initial alignment state that makes the polarization direction of the second polarized light perpendicular to the polarization direction of the first polarized light. In this way, without applying a voltage to the electrode assembly, reflected light perceived by the user may be reduced to a maximum extent, thereby mitigating the problem that images displayed on the display panel cannot be clearly seen in a strong ambient light environment. Alternatively, the voltage provided to the electrode assembly may also be controlled or adjusted such that reflected light perceived by the user may be reduced to a maximum extent on the condition that a voltage having a certain amplitude is applied to the electrode assembly. By adjusting the amplitude of the voltage provided to the electrode assembly, the intensity of the electric field generated by the electrode assembly is adjusted to thereby control the liquid crystal molecules in the liquid crystal cell to be in different alignment states, accordingly, the reflected light may be reduced to different degrees. For example, in an embodiment, the alignment film of the liquid crystal cell makes the liquid crystal molecules have a pretilt angle of 45°, so that the polarization direction of the second polarized light is perpendicular to the polarization direction of the first polarized light. The preset angle herein refers to a tilt angle of the long axis direction of the liquid crystal molecules with respect to the plane of the base substrate of the liquid crystal cell.

In the embodiment of FIG. 1, the liquid crystal cell comprises an array substrate located on a side of the liquid crystal layer 8 facing away from the organic electroluminescent device. The array substrate comprises a pixel electrode 9, the organic electroluminescent device further comprises a cathode layer 6, and the electrode assembly comprises the pixel electrode 9 and the cathode layer 6. The cathode layers of the respective organic electroluminescent devices in the display panel may receive the same reference voltage. By adjusting the voltage applied between the pixel electrode 9 and the cathode layer 6, the deflection of the liquid crystal molecules in the liquid crystal layer 8 can be controlled. In the example of FIG. 1, the cathode layer of the organic electroluminescent device is also used as a reference electrode for receiving a reference voltage in the above electrode assembly, which greatly simplifies the structure of the display panel.

According to an embodiment of the present disclosure, the cathode layer 6 is located on a side of the anode layer 4 facing the liquid crystal layer 8, and the display panel further comprises a color filter layer 7 located on a side of the cathode layer 6 facing the liquid crystal layer 8. Light emitted by the organic electroluminescent device may exhibit different colors after passing through the color filter layer 7, thereby realizing color display of the display panel.

In the example of FIG. 1, the liquid crystal cell comprises an array substrate located on a side of the liquid crystal layer 8 facing away from the organic electroluminescent device, and the array substrate is provided with a pixel electrode 9 on a side facing the organic electroluminescent device. The organic electroluminescent device comprises a cathode layer 6 and an organic electroluminescent layer 5. The cathode layer 6 is located on a side of the anode layer 4 facing the liquid crystal cell, and the organic electroluminescent layer 5 is located between the anode layer 4 and the cathode layer 6. The organic electroluminescent device is formed on a glass substrate 1, a thin film transistor 11 for controlling the organic electroluminescent device is further formed on the glass substrate 1, and a planarization layer 12 is formed between the thin film transistor 11 and the anode layer 4 of the organic electroluminescent device.

Figure 2:
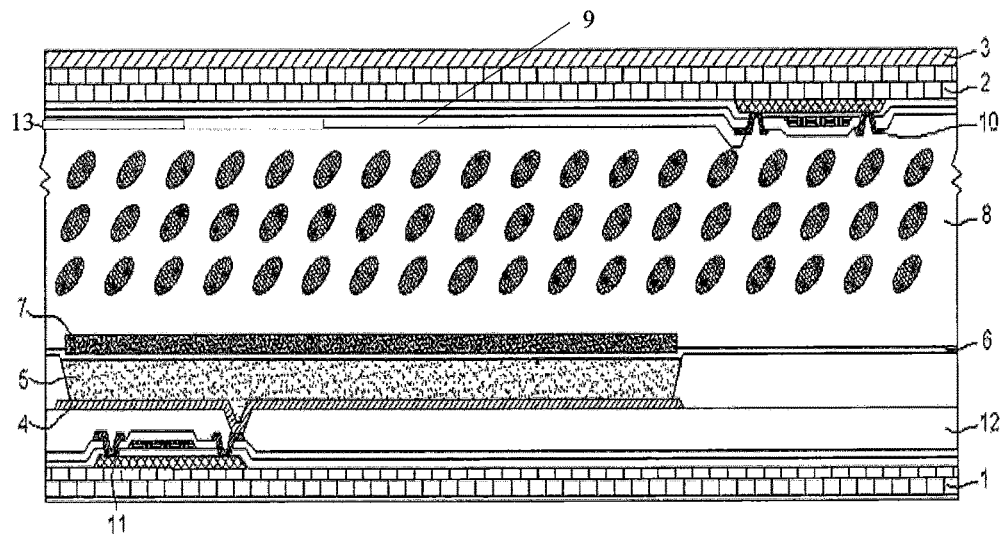
FIG. 2 is a schematic view showing a partial structure of a display panel provided by another embodiment of the present disclosure.

According to another embodiment of the present disclosure, as shown in FIG. 2, the liquid crystal cell comprises an array substrate located on a side of the liquid crystal layer 8 facing away from the organic electroluminescent device. The array substrate comprises a pixel electrode 9 and a common electrode 13, and the electrode assembly comprises the pixel electrode 9 and the common electrode 13. That is, in this embodiment, the electrode assembly for controlling the deflection of the liquid crystal molecules in the liquid crystal cell is completely a component of the array substrate. Unlike the example of FIG. 1, in the example of FIG. 2, the pixel electrode and the common electrode are substantially located in the same layer and isolated from each other, which may generate an electric field in the horizontal direction.

According to a further embodiment of the present disclosure, a liquid crystal cell and a linear polarizer may be directly disposed on an organic electroluminescent device (e.g., OLED) display panel, thereby effectively reducing the amount of reflected light perceived by the user, and improving the definition of the displayed image. Therefore, in an embodiment, as shown in FIG. 3, the liquid crystal cell comprises an array substrate 30 and a counter substrate 40 opposite to each other. The liquid crystal layer is located between the array substrate 30 and the counter substrate 40, and the array substrate 30 is located between the liquid crystal layer and the organic electroluminescent device of an OLED display panel 20. The array substrate 30 has a common electrode 13 and a pixel electrode 9, and the common electrode 13 and the pixel electrode 9 constitute the electrode assembly. It may be appreciated that in this case, the counter substrate 40 may comprise a color filter layer. The linear polarizer 3 is disposed on the color filter substrate 40.

Alternatively, for the embodiment shown in FIG. 3, the pixel electrode 9 and the common electrode 13 may be disposed on the array substrate 30 and the counter substrate 40, respectively. For example, the array substrate is provided with a pixel electrode, and the counter substrate is provided with a common electrode. In this case, the common electrode and the pixel electrode constitute the electrode assembly, and the common electrode and the pixel electrode may generate an electric field in the vertical direction. The color filter layer may be disposed on either of the two opposite sides of the counter substrate, or the color filter layer may be disposed on both sides of the counter substrate.

In a further embodiment of the present disclosure, the liquid crystal cell further comprises an array substrate, and the electrode assembly comprises a pixel electrode in the array substrate. The array substrate comprises a plurality of gate lines and a plurality of data lines. The plurality of gate lines and the plurality of data lines intersect each other to divide the array substrate into a plurality of pixel regions, and a single pixel region among the plurality of pixel regions corresponds to at least one organic electroluminescent device. The pixel region may also be referred to as an adjustment region, and liquid crystal molecules within the pixel region may adjust the polarization state of reflected light exiting therefrom. As shown in FIG. 2, the array substrate comprises a base substrate 2, a thin film transistor 10 on the base substrate 2, gate lines and data lines. The region of a single organic electroluminescent device in the organic electroluminescent display panel may be regarded as a single pixel of the organic electroluminescent display panel. Therefore, in this embodiment, a single pixel region in the array substrate may correspond to at least one pixel of the organic electroluminescent display panel. For example, each pixel region of the array substrate may correspond to one organic electroluminescent device, such that each pixel region of the array substrate individually controls the intensity of ambient light reflected by a single organic electroluminescent device. Alternatively, each pixel region of the array substrate may correspond to a plurality of organic electroluminescent devices. For example, each pixel region (adjustment region) of the array substrate corresponds to 4, 9, 16 or 25 organic electroluminescent devices. At that time, each adjustment region individually controls the intensity of ambient light reflected by a plurality of organic electroluminescent devices (a plurality of pixels).

Another embodiment of the present disclosure provides a display device comprising the display panel described in any of the foregoing embodiments. For the display device provided by the embodiment of the present disclosure, ambient light passes through the linear polarizer 3 and then forms a first linearly polarized light. The first linearly polarized light reaches the anode of the organic electroluminescent device after passing through the liquid crystal layer in the liquid crystal cell and is reflected by the anode. The reflected light will pass through the liquid crystal layer again and be emitted out as a second linearly polarized light. The alignment state of the liquid crystal molecules in the liquid crystal cell can be controlled such that the polarization direction of the second linearly polarized light is different from that of the first linearly polarized light. As a result, at least the amount of ambient light emitted from the polarizer can be reduced, thereby decreasing the intensity of reflected light perceived by the user and improving the definition of the image viewed by the user. For example, the alignment film 50 in the liquid crystal cell may be configured such that the liquid crystal molecules in an initial alignment state make the polarization direction of the first linearly polarized light perpendicular to that of the second linearly polarized light, thereby decreasing the intensity of reflected light perceived by the user to a maximum extent. It is also possible to provide an appropriate voltage to the electrode assembly so as to make the liquid crystal molecules in the liquid crystal cell deflect, such that the polarization direction of the first linearly polarized light is perpendicular to that of the second linearly polarized light. In practice, the user may adjust the amplitude of the voltage provided to the electrode assembly so as to adjust the intensity of the electric field generated by the electrode assembly, thereby adjusting the intensity of ambient light reflected by the anode of the organic electroluminescent device of the display device and emitted from the polarizer, enabling dynamic adjustment of the viewing effect of the displayed image.

Some embodiments of the present disclosure have been described above by way of example. Those skilled in the art can make various modifications and variations to the embodiments herein, without departing from the spirit and scope of the present disclosure. Thus, if these modifications and variations pertain to the scope of the appended claims and equivalent technologies thereof, the present disclosure is also intended to encompass such modifications and variations.

The invention claimed is:

1. A display panel comprising:
an organic electroluminescent device comprising an anode layer and a cathode layer;
a glass substrate for carrying the organic electroluminescent device;
a liquid crystal cell on a light exit side of the organic electroluminescent device, the liquid crystal cell comprising a liquid crystal layer;
a linear polarizer on a side of the liquid crystal cell facing away from the organic electroluminescent device and configured to convert ambient light into a first polarized light; and
an electrode assembly configured to control deflection of liquid crystal molecules in the liquid crystal layer to convert reflected light from the anode layer into a second polarized light,
wherein a second polarization direction of the second polarized light is different from a first polarization direction of the first polarized light,
wherein the liquid crystal cell further comprises an array substrate on a side of the liquid crystal layer facing away from the organic electroluminescent device, the array substrate comprises a pixel electrode between the liquid crystal layer and the linear polarizer, wherein the electrode assembly comprises the pixel electrode.

2. The display panel according to claim 1,
wherein the cathode layer is on a side of the anode layer facing the liquid crystal layer, and
wherein the display panel further comprises a color filter layer on a side of the cathode layer facing the liquid crystal layer, the electrode assembly further comprises the cathode layer.

3. The display panel according to claim 1,
wherein the array substrate further comprises a common electrode between the liquid crystal layer and the linear polarizer, and
wherein the electrode assembly comprises the pixel electrode and the common electrode.

4. A display panel comprising:
an organic electroluminescent device comprising an anode layer;
a liquid crystal cell on a light exit side of the organic electroluminescent device, the liquid crystal cell comprising a liquid crystal layer;
a linear polarizer on a side of the liquid crystal cell facing away from the organic electroluminescent device and configured to convert ambient light into a first polarized light; and
an electrode assembly configured to control deflection of liquid crystal molecules in the liquid crystal layer to convert reflected light from the anode layer into a second polarized light,
wherein a second polarization direction of the second polarized light is different from a first polarization direction of the first polarized light,
wherein the liquid crystal cell further comprises an array substrate and a counter substrate opposite to each other,
wherein the liquid crystal layer is between the array substrate and the counter substrate,
wherein the array substrate is between the liquid crystal layer and the organic electroluminescent device,
wherein the array substrate comprises a common electrode and a pixel electrode, and
wherein the electrode assembly comprises the pixel electrode and the common electrode.

5. The display panel according to claim 4, wherein the counter substrate comprises a color filter layer.

6. A display panel comprising:
an organic electroluminescent device comprising an anode layer;
a liquid crystal cell on a light exit side of the organic electroluminescent device, the liquid crystal cell comprising a liquid crystal layer;
a linear polarizer on a side of the liquid crystal cell facing away from the organic electroluminescent device and configured to convert ambient light into a first polarized light; and
an electrode assembly configured to control deflection of liquid crystal molecules in the liquid crystal layer to convert reflected light from the anode layer into a second polarized light,
wherein a second polarization direction of the second polarized light is different from a first polarization direction of the first polarized light,
wherein the liquid crystal cell further comprises an array substrate and a counter substrate opposite to each other,
wherein the liquid crystal layer is between the array substrate and the counter substrate,
wherein the array substrate is between the liquid crystal layer and the organic electroluminescent device,
wherein the array substrate comprises a pixel electrode,
wherein the counter substrate comprises a common electrode, and
wherein the electrode assembly comprises the pixel electrode and the common electrode.

7. The display panel according to claim 6, wherein the counter substrate comprises a color filter layer.

8. The display panel according to claim 1,
wherein the array substrate comprises a plurality of gate lines and a plurality of data lines,
wherein ones of the plurality of gate lines and ones of the plurality of data lines intersect each other to divide the array substrate into a plurality of pixel regions, and
wherein a single pixel region among the plurality of pixel regions corresponds to at least one organic electroluminescent device.

9. The display panel according to claim 1,
wherein the liquid crystal cell comprises an alignment film,
wherein the alignment film is configured to determine an initial state of the liquid crystal molecules such that the second polarization direction of the second polarized light is perpendicular to the first polarization direction of the first polarized light.

10. A display device comprising the display panel according to claim 1.

11. The display device according to claim 10,
wherein the electrode assembly comprises the cathode layer.

12. The display device according to claim 11,
wherein the cathode layer is on a side of the anode layer facing the liquid crystal layer, and
wherein the display panel further comprises a color filter layer on a side of the cathode layer facing the liquid crystal layer.

13. The display device according to claim 10,
wherein the array substrate further comprises a common electrode between the liquid crystal layer and the linear polarizer, and
wherein the electrode assembly comprises the pixel electrode and the common electrode.

14. A display device comprising the display panel according to claim 4.

15. The display device according to claim 14, wherein the counter substrate comprises a color filter layer.

16. A display device comprising the display panel according to claim 6.

17. The display device according to claim 10,
wherein the array substrate comprises a plurality of gate lines and a plurality of data lines,
wherein ones of the plurality of gate lines and ones of the plurality of data lines intersect each other to divide the array substrate into a plurality of pixel regions, and
wherein a single pixel region among the plurality of pixel regions corresponds to at least one organic electroluminescent device.

18. The display device according to claim 10,
wherein the liquid crystal cell comprises an alignment film,
wherein the alignment film is configured to determine an initial state of the liquid crystal molecules such that the second polarization direction of the second polarized light is perpendicular to the first polarization direction of the first polarized light.

* * * * *